(12) United States Patent
Chin et al.

(10) Patent No.: US 8,830,960 B2
(45) Date of Patent: Sep. 9, 2014

(54) METHOD AND APPARATUS FOR MAINTAINING COMMUNICATION DURING A BATON HANDOVER

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/379,612

(22) PCT Filed: Mar. 31, 2010

(86) PCT No.: PCT/US2010/029512
§ 371 (c)(1),
(2), (4) Date: Dec. 20, 2011

(87) PCT Pub. No.: WO2011/034634
PCT Pub. Date: Mar. 24, 2011

(65) Prior Publication Data
US 2012/0163340 A1 Jun. 28, 2012

Related U.S. Application Data

(60) Provisional application No. 61/244,376, filed on Sep. 21, 2009.

(51) Int. Cl.
*H04W 36/04* (2009.01)
(52) U.S. Cl.
USPC ............ 370/331; 370/329; 455/435; 455/524
(58) Field of Classification Search
USPC ........................ 370/328–331; 455/422.1, 436
See application file for complete search history.

(56) References Cited

U.S. PATENT DOCUMENTS

| 2003/0123396 A1* | 7/2003 | Seo et al. ................. 370/252 |
| 2004/0072565 A1* | 4/2004 | Nobukiyo et al. ............ 455/436 |
| 2004/0192308 A1* | 9/2004 | Lee et al. .................. 455/436 |
| 2006/0007889 A1* | 1/2006 | Khan ....................... 370/331 |
| 2006/0034240 A1* | 2/2006 | Kwak et al. ................ 370/342 |
| 2006/0146751 A1* | 7/2006 | Obuchi et al. .............. 370/331 |

(Continued)

FOREIGN PATENT DOCUMENTS

| CN | 1694565 | * | 9/2005 | ............... H04Q 7/38 |
| CN | 1678115 A | | 10/2005 | |

(Continued)

OTHER PUBLICATIONS

Recent Advances on TD-SCDMA in China dated Jan. 2005, Bo Li, Hong Kong University of Science and Technology, Dongliang Xie, Shiduan Cheng, Junliang Chen, and Ping Zhang, Beijing University of Posts and Telecommunications, Wenwu Zhu, Microsoft Research Asia; Bin Li, China Motion Telecom.*

(Continued)

*Primary Examiner* — Andrew Chriss
*Assistant Examiner* — John Lequang
(74) *Attorney, Agent, or Firm* — Kristine U. Ekwueme

(57) ABSTRACT

A method and apparatus enable high-speed downlink data transmissions to continue while a baton handover is in progress. In an aspect of the disclosure, a method of wireless communication includes switching an uplink from a source cell to a target cell while maintaining a downlink with the source cell, and transmitting over the uplink to the target cell at least one metric of quality of the downlink. In one example, the metric of quality may be a CQI. In another example, the metric of quality may be a HARQ ACK/NACK. The metric of quality of the downlink may be transmitted from the target cell to the source cell, directly or by way of a radio network controller.

44 Claims, 6 Drawing Sheets

(56) References Cited

U.S. PATENT DOCUMENTS

| | | | |
|---|---|---|---|
| 2007/0201407 A1* | 8/2007 | Borran et al. | 370/335 |
| 2008/0002567 A1 | 1/2008 | Bourlas et al. | |
| 2008/0291878 A1* | 11/2008 | Zhang et al. | 370/336 |
| 2008/0311910 A1* | 12/2008 | Ishii et al. | 455/436 |
| 2009/0104890 A1* | 4/2009 | Wang et al. | 455/410 |
| 2010/0195544 A1* | 8/2010 | Anderson et al. | 370/280 |
| 2010/0296473 A1* | 11/2010 | Kim et al. | 370/329 |
| 2010/0323749 A1* | 12/2010 | Lee et al. | 455/524 |

FOREIGN PATENT DOCUMENTS

| | | |
|---|---|---|
| TW | 200812304 A | 3/2008 |
| TW | 200939663 A | 9/2009 |
| WO | WO2005096641 | 10/2005 |
| WO | WO2007114966 | 10/2007 |
| WO | WO2008156246 | 12/2008 |

OTHER PUBLICATIONS

Bo Li et al., "Recent advances on TD-SCDMA in China," IEEE Communications Magazine, IEEE Service Center, 2005, vol. 43, 30-37.

International Search Report and Written Opinion—PCT/US2010/029512, International Search Authority—European Patent Office—Sep. 16, 2010.

Taiwan Search Report—TW099110601—TIPO—Apr. 22, 2013

\* cited by examiner

METHOD AND APPARATUS FOR MAINTAINING COMMUNICATION DURING A BATON HANDOVER

CROSS-REFERENCE TO RELATED APPLICATIONS

This application claims the benefit of U.S. Provisional Patent Application No. 61/244,376, entitled "APPARATUS AND METHOD FOR MAINTAINING COMMUNICATION DURING A BATON HANDOVER," filed on Sep. 21, 2009, which is expressly incorporated by reference herein in its entirety.

BACKGROUND

1. Field

Aspects of the present disclosure relate generally to wireless communication systems, and more particularly, to the management of a handoff between a source cell and a target cell in cellular communication systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

According to various aspects of the instant disclosure, procedures are provided to enable high-speed downlink data transmission to continue while a baton handover is in progress. The instant disclosure further enables a higher data throughput during the baton handover procedure.

In an aspect of the disclosure, a method of wireless communication includes switching an uplink from a source cell to a target cell while maintaining a downlink with the source cell, and transmitting over the uplink to the target cell at least one metric of quality of the downlink.

In an aspect of the disclosure, a computer program product includes a computer-readable medium having code for switching an uplink from a source cell to a target cell while maintaining a downlink with the source cell, and code for transmitting over the uplink to the target cell at least one metric of quality of the downlink.

In an aspect of the disclosure, an apparatus operable in a wireless communication system includes at least one processor and a memory coupled to the at least one processor. Here, the at least one processor is configured to switch an uplink from a source cell to a target cell while maintaining a downlink with the source cell and transmit over the uplink to the target cell at least one metric of quality of the downlink In an aspect of the disclosure, an apparatus for wireless communication includes means for switching an uplink from a source cell to a target cell while maintaining a downlink with the source cell and means for transmitting over the uplink to the target cell at least one metric of quality of the downlink.

In an aspect of the disclosure, a method of wireless communication includes switching an uplink from a source cell to a target cell while maintaining a downlink at the source cell, receiving over the uplink, at the target cell, at least one metric of quality of the downlink, and communicating from the target cell to the source cell the at least one metric of quality of the downlink.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
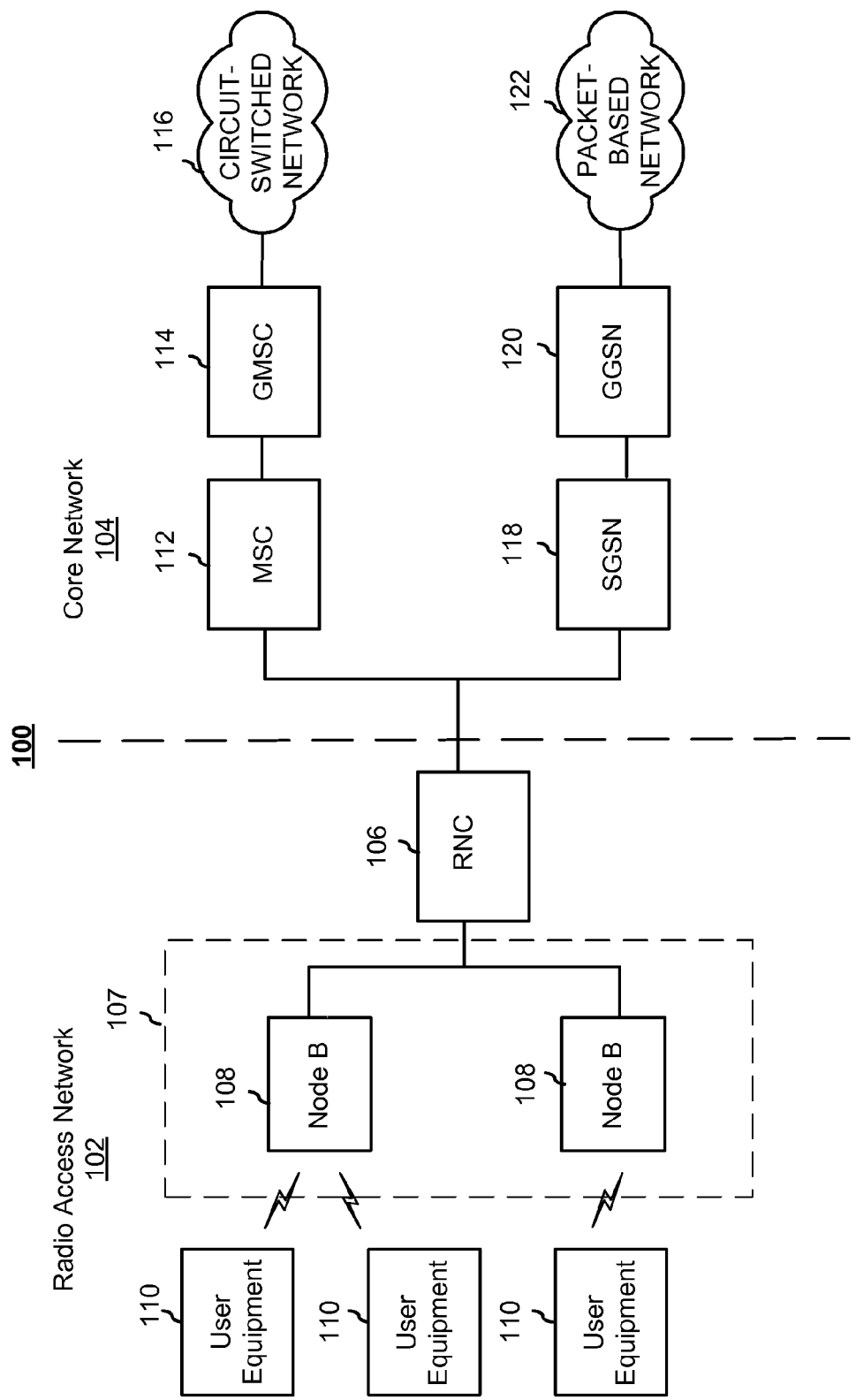
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the UL and DL between a Node B 108 and a UE 110, but divides uplink and downlink transmissions into different time slots in the carrier.

Figure 2:
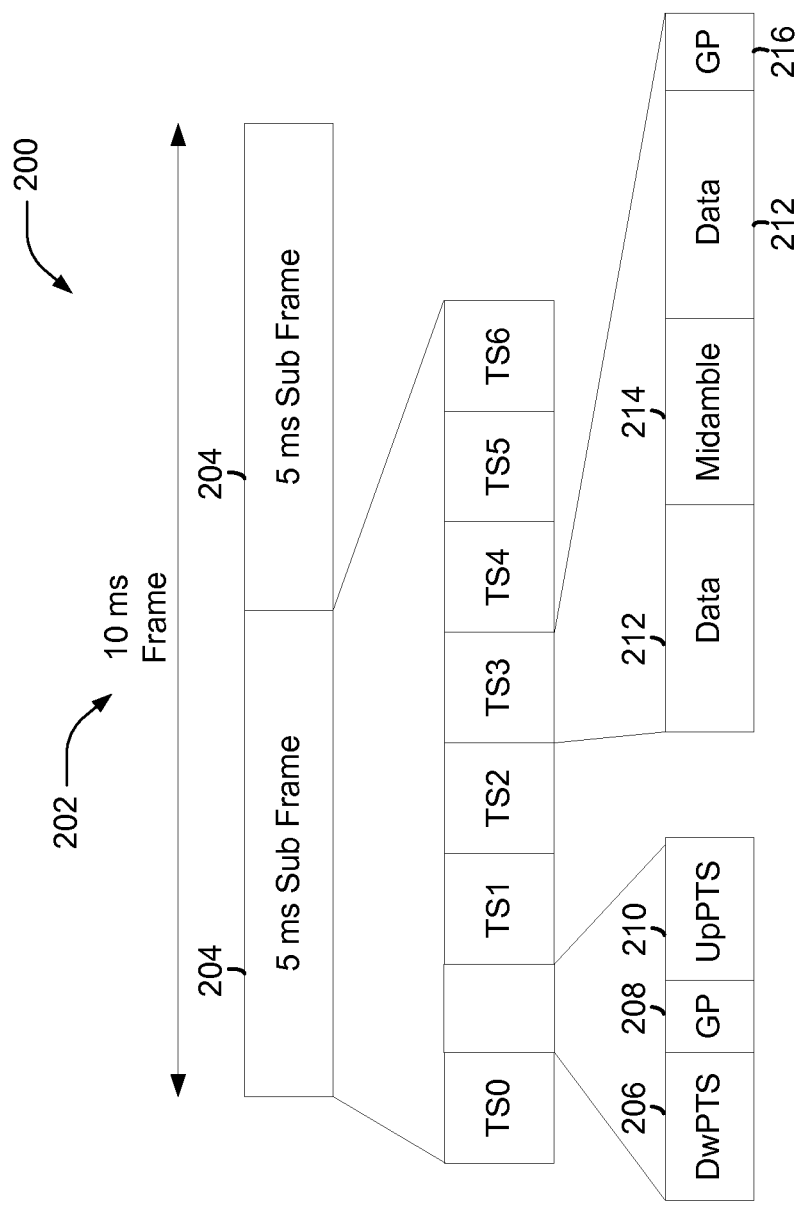
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
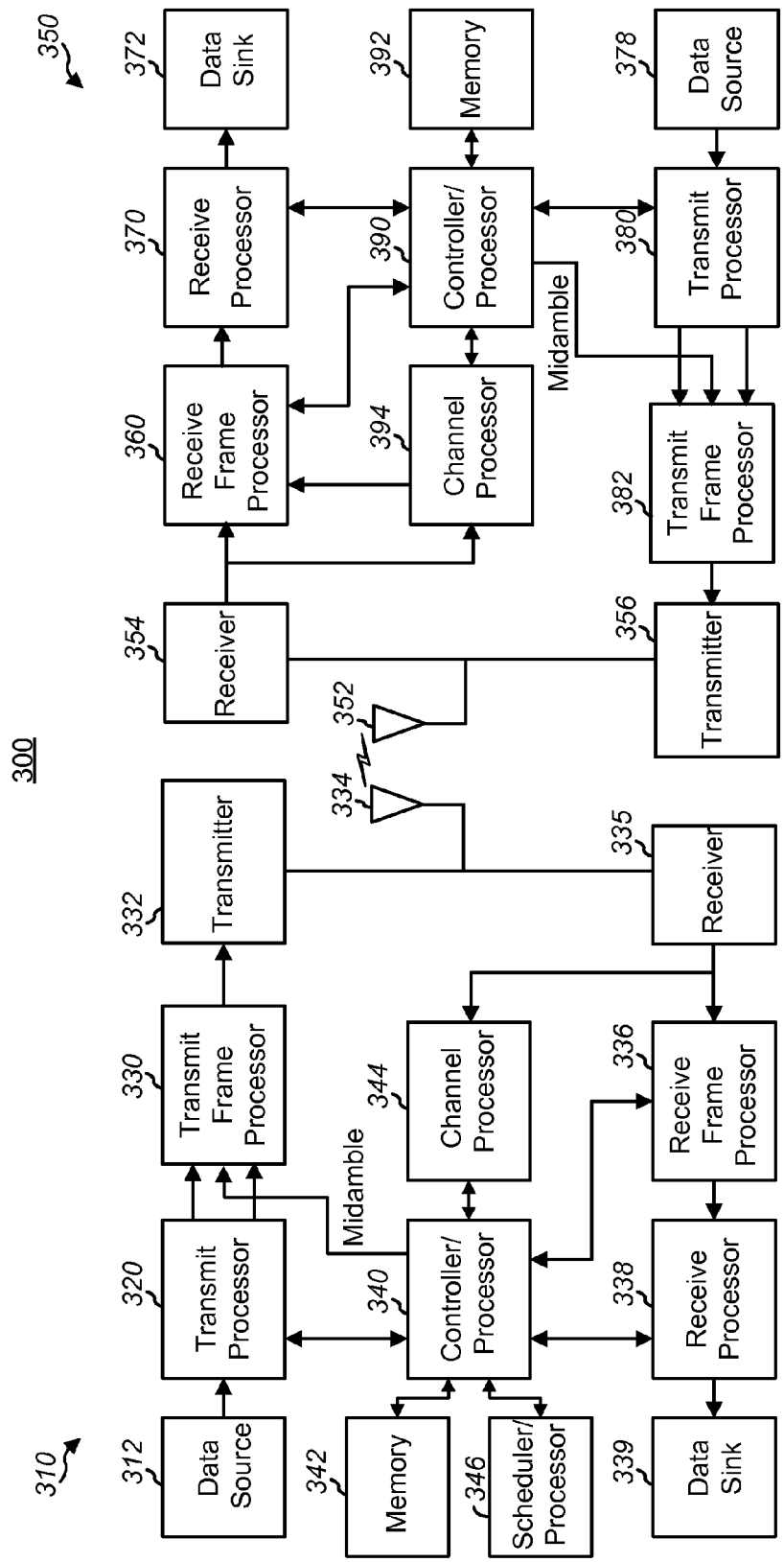
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an ACK and/or NACK protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

In one configuration, the apparatus 350 for wireless communication includes means for switching an uplink from a source cell to a target cell while maintaining a downlink with the source cell, means for transmitting over the uplink to the target cell at least one metric of quality of the downlink, and/or means for switching the downlink from the source cell to the target cell. In one aspect, the aforementioned means may include the channel processor 394 and/or the controller/processor 390 configured to perform the functions recited by the aforementioned means. In another aspect, the aforementioned means may be a module or any apparatus configured to perform the functions recited by the aforementioned means.

TD-SCDMA systems that utilize HSDPA as defined in UMTS Rel. 5 or later use physical channels including HS-PDSCH, HS-SCCH, and HS-SICH. HS-PDSCH is the High-Speed Physical Downlink Shared Channel, which carries information such as a user data burst. HS-SCCH is the High-Speed Shared Control Channel, which carries the information such as a modulation, coding scheme, and channelization code information for the data burst in HS-PDSCH. HS-SICH is the High-Speed Shared Information Channel, which carries information such as a Channel Quality Indicator (CQI), which includes RTBS (Recommended Transport Block Size) and RMF (Recommended Modulation Format), and HARQ (Hybrid Automatic Repeat ReQuest) ACK/NACK corresponding to the HS-PDSCH transmission. All these channels may be transmitted on a certain time slot (TS) in the frame structure illustrated in FIG. 2.

CQI is a channel quality indicator, utilized by the Node B 108 to determine the modulation format and transport block size for data transmitted over the downlink. CQI may be determined by the UE based on a measurement of various metrics of quality of the DL channel. That is, the UE may determine at least one metric of quality of the DL channel and may periodically transmit the at least one metric of quality on the UL channel. For example, the metric of quality may correspond to the power of the received signal, the level of interference, or other information related to the quality of the channel. Correspondingly, if the channel quality is poor, the Node B may change the modulation format to a more conservative or robust format, or decrease the bit rate, etc., with an aim to reduce the error rate at the UE 110.

Further, a hybrid automatic repeat request (HARQ) utilizes an ACK/NACK. According to the HARQ system, when there are some errors in the transmission of data, determined by the UE 110 for example by the failure of a checksum or CRC, the UE 110 sends a NACK signal and stores the received data. Based on the NACK signal, the Node B may re-transmit the data. However, again, it is possible that there will be errors in the re-transmission of the data. The HARQ system improves the success rate by combining the previously received data with the retransmission of the data in such a way that the probability of success in decoding the entire data frame is higher. This process is sometimes referred to as incremental redundancy.

Figure 4:
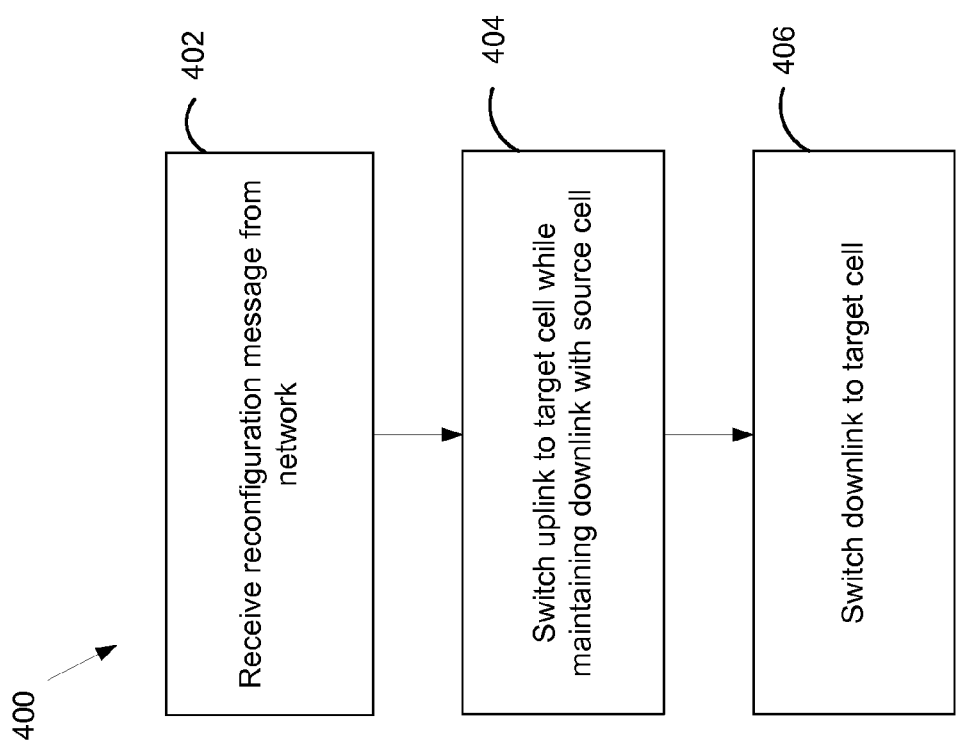
FIG. 4 is a flow chart conceptually illustrating one example of a baton handover procedure.

One feature of TD-SCDMA is the baton handover. In a baton handover procedure, illustrated in the flow chart 400 in FIG. 4, the network generally sends 402 a message to the UE 110 to command the start of baton handover. Then, the UE 110 first switches 404 the UL to the target cell while maintaining the DL with the source cell. Then, the UE 110 switches 406 the DL to the target cell. Thus, it is seen that the baton handover procedure is a two-step process, where the UL is switched first, followed by the DL.

Normally, the UE 110 may only transmit or receive from one cell at one time. During the baton handover, however, the UE 110 may temporarily maintain its DL with the source cell and its UL with the target cell. Therefore, it may not be possible for UE 110 to report the CQI and ACK/NACK information to the source cell which transmits the high-speed DL data, because the UE 110 is already transmitting to the target cell during the baton handover. That is, the source cell, which is transmitting the DL to the UE 110, lacks the channel quality information normally provided on the UL, because the UL has already been switched to the target cell.

One solution is for the source cell, which maintains the DL with the UE 110, to utilize old, previously-sent CQI values and to determine the parameters of the signal transmission to the UE 110 during the intermediate time frame before the DL is handed over to the target cell, based on that old information. Further, as for the ACK/NACK, a solution is for the source cell to assume success of the UE 110 in receiving the data, or to retransmit a predetermined number of times. However, these solutions are unsatisfactory overall because they each would result in a deterioration of the likelihood of success at the UE 110 during the baton handover.

Thus, according to various aspects of the instant disclosure, a procedure is described that enables the source cell, which maintains the DL, to receive the CQI and ACK/NACK messages.

Figure 5:
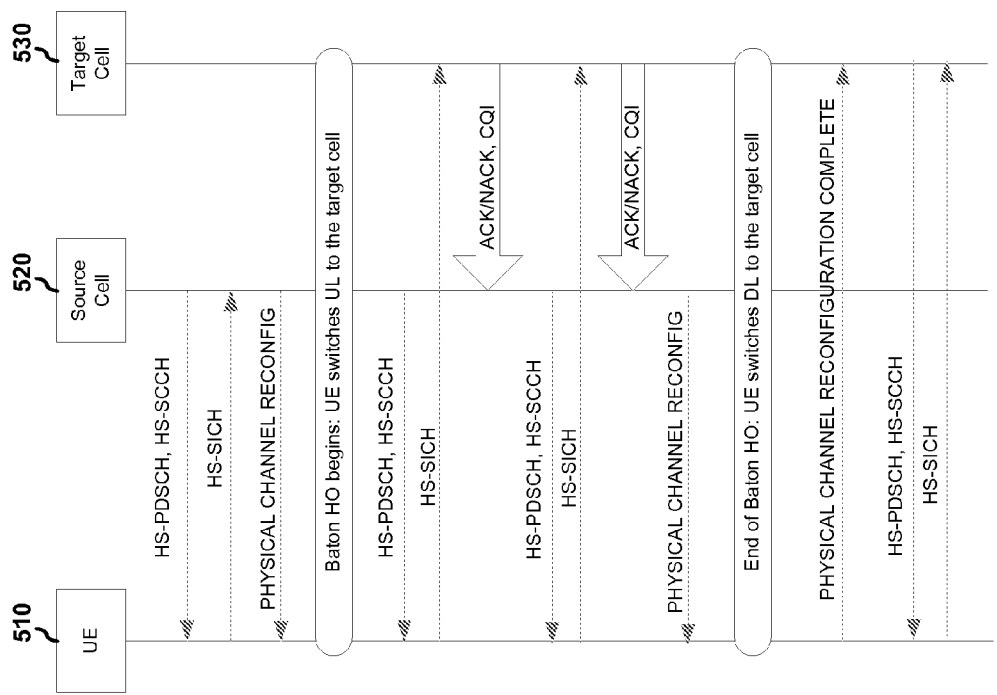
FIG. 5 is a call flow diagram conceptually illustrating one example of a baton handover procedure according to an aspect of the disclosure.
Figure 6:
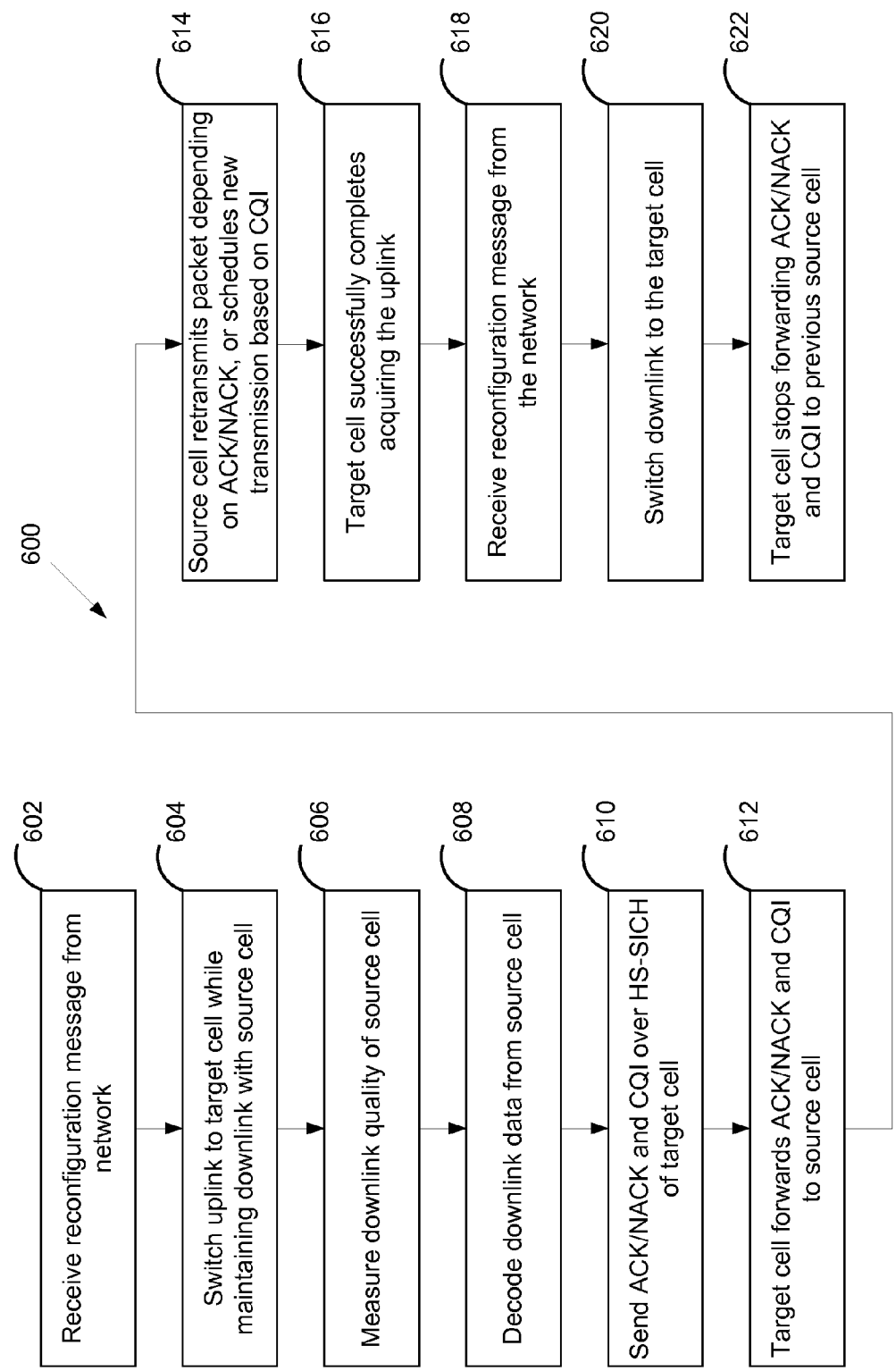
FIG. 6 is a flow chart conceptually illustrating the baton handover procedure shown in FIG. 5.

According to an aspect of the disclosure, as illustrated in the call flow diagram of FIG. 5 and the flow chart of FIG. 6, the UE 510 is in communication with a source cell 520. That is, prior to the baton handover procedure to be described below, the UL and the DL may both be established between the UE 510 and the source cell 520 over the HS-SICH; and HS-PDSCH and HS-SCCH channels, respectively.

The baton handover procedure begins, for example, being triggered by the source cell 520 sending a reconfiguration message 602 indicating for the UE 510 to switch the UL channel (e.g., the PHYSICAL CHANNEL RECONFIGURATION message). Here, the PHYSICAL CHANNEL RECONFIGURATION message may also include HS-SICH as well as HS-PDSCH and HS-SCCH information for the UE 510 to be used in the target cell.

The UE 510 may then switch 604 its UL, that is, it may utilize the HS-SICH of the target cell 530, while maintaining the DL with the source cell 520. At this time, the UE 510 may continue to decode 608 the high-speed DL data from the source cell 520, but may now utilize the HS-SICH of the target cell 530 to report 610 ACK/NACK. Further, the UE 510 may continue to measure 606 the DL channel quality of the source cell, but utilize the HS-SICH of the target cell 530 to report 610 CQI.

According to an aspect of the disclosure, the target cell 530 may forward 612 both the ACK/NACK and the CQI information received over the HS-SICH to the source cell 520, which may thereby schedule a new transmission based on CQI or retransmit the physical layer packet depending on the ACK/NACK, as shown in block 614.

The UE 510 may later switch 620 the DL to the target cell 530 when the target cell 530 successfully completes acquiring 616 the UL and other processing. For example, the switching 620 of the DL may be triggered 618 by a second PHYSICAL CHANNEL RECONFIGURATION message. Upon completion of the switching of the DL, the UE 510 may send the PHYSICAL CHANNEL RECONFIGURATION COMPLETE message to the target cell 530. Upon receipt of the PHYSICAL CHANNEL RECONFIGURATION COMPLETE message, the reporting of the CQI and ACK/NACK become associated with the target cell 530. Accordingly, the target cell 530 stops forwarding 622 the CQI and ACK/NACK to the source cell 520.

Note that in certain aspects of the disclosure, the source cell 520 and the target cell 530 are not necessarily different hardware. That is, in some aspects, a Node B 108 (see FIG. 1) may include directionally oriented sectors. For example, one Node B 108 may include three sectors, each covering a span of 120° around the Node B 108. In this case, a handover from one sector to another sector (e.g., from a source cell to a target cell) does not transfer to a different Node B 108, but simply is handled by a different sector of the same Node B 108. In this scenario, the communication 612 of the CQI and ACK/NACK information from the target cell to the source cell is very fast, and has very little latency, as it likely has a very short distance (or no distance) to travel.

In another aspect, the source cell 520 and the target cell 530 are at different locations, for example, at different Node Bs 108. In this situation, a communications interface is provided between the target cell 530 and the source cell 520. For example, a direct communications interface from the target cell to the source cell, or an indirect interface passing through an intermediate unit, such as a router or other piece of network equipment. In some aspects, the source cell and target cell are communicatively coupled through an RNC that enables communication 612 between the target cell and the source cell. In these systems, the latency or delay of the sending of the CQI and ACK/NACK signals from the target cell to the source cell should be taken into account.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   switching an uplink from a source cell to a target cell while maintaining a downlink with the source cell, wherein the uplink on the source cell is no longer being actively utilized after the switching; and
   transmitting directly over the uplink to the target cell at least one metric of quality of the downlink.

2. The method of claim 1, wherein the uplink comprises a high speed shared information channel (HS-SICH) between a user equipment (UE) and a respective cell, and the downlink comprises a high speed physical downlink shared channel (HS-PDSCH) and a high speed shared control channel (HS-SCCH).

3. The method of claim 1, wherein the at least one metric of quality of the downlink corresponds to a signal power or an amount of signal interference of the downlink from the source cell.

4. The method of claim 1, wherein the at least one metric of quality comprises a channel quality indicator (CQI).

5. The method of claim 4, wherein the CQI is associated with at least one of a modulation format, a data rate, a number of codes used, or a transport block size for the HS-PDSCH.

6. The method of claim 1, wherein the at least one metric of quality of the downlink comprises an acknowledgment or non-acknowledgment of a determination of integrity of a data packet transmitted from the source cell over the downlink.

7. The method of claim 6, wherein the determination of integrity comprises a checksum or a cyclic redundancy check.

8. The method of claim 1, wherein the at least one metric of quality comprises a hybrid automatic repeat request acknowledgment and/or non-acknowledgment (HARQ ACK/NACK).

9. The method of claim 1, further comprising receiving information over the downlink from the source cell, the information being transmitted utilizing a modulation format or a transport block size based on the at least one metric of quality.

10. The method of claim 1, further comprising switching the downlink from the source cell to the target cell.

11. A computer program product, comprising:
a non-transitory computer-readable medium comprising:
code for switching an uplink from a source cell to a target cell while maintaining a downlink with the source cell, wherein the uplink on the source cell is no longer being actively utilized after the switching; and
code for transmitting directly over the uplink to the target cell at least one metric of quality of the downlink.

12. The computer program product of claim 11, wherein the uplink comprises a high speed shared information channel (HS-SICH) between a user equipment (UE) and a respective cell, and the downlink comprises a high speed physical downlink shared channel (HS-PDSCH) and a high speed shared control channel (HS-SCCH).

13. The computer program product of claim 11, wherein the at least one metric of quality of the downlink corresponds to a signal power or an amount of signal interference of the downlink from the source cell.

14. The computer program product of claim 11, wherein the at least one metric of quality comprises a channel quality indicator (CQI).

15. The computer program product of claim 14, wherein the CQI is associated with at least one of a modulation format, a data rate, a number of codes used, or a transport block size for the HS-PDSCH.

16. The computer program product of claim 11, wherein the at least one metric of quality of the downlink comprises an acknowledgment or non-acknowledgment of a determination of integrity of a data packet transmitted from the source cell over the downlink.

17. The computer program product of claim 16, wherein the determination of integrity comprises a checksum or a cyclic redundancy check.

18. The computer program product of claim 11, wherein the at least one metric of quality comprises a hybrid automatic repeat request acknowledgment and/or non-acknowledgment (HARQ ACK/NACK).

19. The computer program product of claim 11, further comprising code for receiving information over the downlink from the source cell, the information being transmitted utilizing a modulation format or a transport block size based on the at least one metric of quality.

20. The computer program product of claim 11, further comprising code for switching the downlink from the source cell to the target cell.

21. An apparatus operable in a wireless communication system, the apparatus comprising:
at least one processor; and
a memory coupled to the at least one processor,
wherein the at least one processor is configured to:
switch an uplink from a source cell to a target cell while maintaining a downlink with the source cell, wherein the uplink on the source cell is no longer being actively utilized after the switching; and
transmit directly over the uplink to the target cell at least one metric of quality of the downlink.

22. The apparatus of claim 21, wherein the uplink comprises a high speed shared information channel (HS-SICH) between a user equipment (UE) and a respective cell, and the downlink comprises a high speed physical downlink shared channel (HS-PDSCH) and a high speed shared control channel (HS-SCCH).

23. The apparatus of claim 21, wherein the at least one metric of quality of the downlink corresponds to a signal power or an amount of signal interference of the downlink from the source cell.

24. The apparatus of claim 21, wherein the at least one metric of quality comprises a channel quality indicator (CQI).

25. The apparatus of claim 24, wherein the CQI is associated with at least one of a modulation format, a data rate, a number of codes used, or a transport block size for the HS-PDSCH.

26. The apparatus of claim 21, wherein the at least one metric of quality of the downlink comprises an acknowledgment or non-acknowledgment of a determination of integrity of a data packet transmitted from the source cell over the downlink.

27. The apparatus of claim 26, wherein the determination of integrity comprises a checksum or a cyclic redundancy check.

28. The apparatus of claim 21, wherein the at least one metric of quality comprises a hybrid automatic repeat request acknowledgment and/or non-acknowledgment (HARQ ACK/NACK).

29. The apparatus of claim 21, wherein the at least one processor is further configured to receive information over the downlink from the source cell, the information being transmitted utilizing a modulation format or a transport block size based on the at least one metric of quality.

30. The apparatus of claim 21, wherein the at least one processor is further configured to switch the downlink from the source cell to the target cell.

31. An apparatus for wireless communication, comprising:
means for switching an uplink from a source cell to a target cell while maintaining a downlink with the source cell, wherein the uplink on the source cell is no longer being actively utilized after the switching; and
means for transmitting directly over the uplink to the target cell at least one metric of quality of the downlink.

32. The apparatus of claim 31, wherein the uplink comprises a high speed shared information channel (HS-SICH) between a user equipment (UE) and a respective cell, and the downlink comprises a high speed physical downlink shared channel (HS-PDSCH) and a high speed shared control channel (HS-SCCH).

33. The apparatus of claim 31, wherein the at least one metric of quality of the downlink corresponds to a signal power or an amount of signal interference of the downlink from the source cell.

34. The apparatus of claim 31, wherein the at least one metric of quality comprises a channel quality indicator (CQI).

35. The apparatus of claim 34, wherein the CQI is associated with at least one of a modulation format, a data rate, a number of codes used, or a transport block size for the HS-PDSCH.

36. The apparatus of claim 31, wherein the at least one metric of quality of the downlink comprises an acknowledgment or non-acknowledgment of a determination of integrity of a data packet transmitted from the source cell over the downlink.

37. The apparatus of claim 36, wherein the determination of integrity comprises a checksum or a cyclic redundancy check.

38. The apparatus of claim 31, wherein the at least one metric of quality comprises a hybrid automatic repeat request acknowledgment and/or non-acknowledgment (HARQ ACK/NACK).

39. The apparatus of claim 31, further comprising means for receiving information over the downlink from the source cell, the information being transmitted utilizing a modulation format or a transport block size based on the at least one metric of quality.

40. The apparatus of claim 31, further comprising means for switching the downlink from the source cell to the target cell.

41. A method of wireless communication, comprising:
   switching an uplink from a source cell to a target cell while maintaining a downlink at the source cell, wherein the uplink on the source cell is no longer being actively utilized after the switching;
   receiving directly over the uplink, at the target cell, at least one metric of quality of the downlink; and
   communicating from the target cell to the source cell the at least one metric of quality of the downlink.

42. The method of claim 41, further comprising determining a modulation format or a transport block size for the downlink from the source cell based on the at least one metric of quality of the downlink.

43. The method of claim 41, wherein the communicating from the target cell to the source cell the at least one metric of quality of the downlink comprises:

sending the at least one metric of quality of the downlink from the target cell to a radio network controller communicatively coupled to the source cell and the target cell; and receiving at the source cell, from the radio network controller, the at least one metric of quality of the downlink.

44. The method of claim 41, further comprising:

switching the downlink from the source cell to the target cell; and ceasing the communicating of the at least one metric of quality of the downlink from the target cell to the source cell.

* * * * *